US012742596B2

(12) United States Patent
Tanamura et al.

(10) Patent No.: US 12,742,596 B2
(45) Date of Patent: Sep. 22, 2026

(54) HEAT TREATMENT SYSTEM

(71) Applicants: NGK INSULATORS, LTD., Nagoya (JP); NGK KILNTECH, CORPORATION, Nagoya (JP)

(72) Inventors: Masashi Tanamura, Nagoya (JP); Tomoaki Oyama, Nagoya (JP); Takanori Isono, Nagoya (JP)

(73) Assignees: NGK INSULATORS, LTD., Nagoya (JP); NGK KILNTECH, CORPORATION, Nagoya (JP)

( * ) Notice: Subject to any disclaimer, the term of this patent is extended or adjusted under 35 U.S.C. 154(b) by 381 days.

(21) Appl. No.: 18/460,766

(22) Filed: Sep. 5, 2023

(65) Prior Publication Data

US 2024/0102735 A1 Mar. 28, 2024

(30) Foreign Application Priority Data

Sep. 22, 2022 (JP) ................................ 2022-151257

(51) Int. Cl.
*F27B 9/24* (2006.01)
*F27B 9/40* (2006.01)

(52) U.S. Cl.
CPC . *F27B 9/24* (2013.01); *F27B 9/40* (2013.01)

(58) Field of Classification Search
CPC ...... F27B 9/24; F27B 9/40; F27B 9/02; F27B 9/2407; F27B 9/029; F27B 9/00; F27B 9/26; F27D 3/12; F27D 5/0012; F27D 2003/124
See application file for complete search history.

(56) References Cited

U.S. PATENT DOCUMENTS

2009/0004615 A1* 1/2009 Graham .................. F27B 15/02 432/121
2021/0195754 A1 6/2021 Van De Vijver et al.

FOREIGN PATENT DOCUMENTS

CN 113606936 A * 11/2021 ............. F27D 17/20
DE 11 2018 005 426 T5 6/2020
JP S55-078621 U 5/1980
JP H05-221508 A 8/1993
(Continued)

OTHER PUBLICATIONS

Japanese Third Party Submission (with English translation) dated Oct. 22, 2024 (Application No. 2022-151257).
(Continued)

*Primary Examiner* — Gregory A Wilson
(74) *Attorney, Agent, or Firm* — Muncy, Geissler, Olds & Lowe, P.C.

(57) ABSTRACT

A heat treatment system may include a heat treatment furnace configured to heat treat a material in a saggar; a conveyor configured to convey the saggar from an exit to an entrance of the heat treatment furnace; a recovery device configured to recover the material heat-treated; a supply device configured to supply a non-heat-treated material to the saggar; and a hood covering the conveying path. The conveying path may include a first conveying path disposed on at least a part of the conveying path between the recovery device and the supply device; and a second conveying path disposed on other part of the conveying path than the part where the first conveying path is disposed. The hood may be disposed over the second conveying path and may not be disposed over the first conveying path.

8 Claims, 5 Drawing Sheets

(56) References Cited

FOREIGN PATENT DOCUMENTS

| | | | | | |
|---|---|---|---|---|---|
| JP | H07-010246 | A | | 1/1995 | |
| JP | H10-167442 | A | | 6/1998 | |
| JP | 2007-187398 | A | | 7/2007 | |
| JP | 2008-057887 | A | | 3/2008 | |
| JP | 2013-108849 | A | | 6/2013 | |
| JP | 2019-184211 | A | | 10/2019 | |
| JP | 7041300 | B1 | | 3/2022 | |
| JP | 7041302 | B1 | | 3/2022 | |
| JP | 7047563 | B2 | * | 4/2022 | |
| JP | 7090784 | B1 | * | 6/2022 | ............ H01M 4/525 |
| JP | 2022150899 | A | * | 10/2022 | |
| WO | 2020/110405 | A1 | | 6/2020 | |

OTHER PUBLICATIONS

Partial English translation of Japanese Third Party Submission dated Jun. 19, 2024 (Application No. 2022-151257).

Japanese Office Action (with English translation) dated Aug. 6, 2024 (Application No. 2022-151257).

German Office Action (Application No. 10 2023 125 463.4) dated Oct. 30, 2025 (with English translation) (10 pages).

* cited by examiner

HEAT TREATMENT SYSTEM

CROSS-REFERENCE TO RELATED APPLICATION

The present application claims priority to Japanese Patent Application No. 2022-151257, filed on Sep. 22, 2022, the entire contents of which are incorporated herein by reference.

TECHNICAL FIELD

The disclosure herein relates to a technology for heat treating a material.

BACKGROUND ART

Heat treatment furnaces (e.g., roller hearth kilns, pusher kilns, etc.) may be used to heat treat materials. For example, in order to heat treat a material such as powder in a heat treatment furnace, the material is put in a saggar for heat treatment. The saggar is used repeatedly. For example, Japanese Patent No. 7041300 describes a heat treatment system including a heat treatment furnace and a conveyor that conveys a saggar from an exit to an entrance of the heat treatment furnace. In the heat treatment system, a recovery device that recovers heat-treated material from the saggar and a supply device that supplies non-heat-treated material to the saggar are disposed on a conveying path of the conveyor. Also, in the heat treatment system of Japanese Patent No. 7041300, a hood is installed to cover the conveying path of the conveyor. This prevents foreign matters from entering the saggar while the saggar is conveyed on the conveying path by the conveyor.

DESCRIPTION

Summary

In the heat treatment system of Japanese Patent No. 7041300, the saggar is reused after being used for heat treatment of the material. A saggar may be cracked due to the repeated use. Further, although a saggar is reused after the heat-treated material has been recovered in the recovery device, some heat-treated material may remain in the saggar. Therefore, before the material is supplied to the saggar by the supply device, it is necessary to eliminate the saggar if it is cracked and/or remove the remaining heat-treated material, if any, from the saggar. Thus, it is required to check the condition of the saggar after the heat-treated material has been recovered in the recovery device. For example, the condition of the saggar can be automatically checked by using a laser or the like, however, in order to check the condition of the saggar more accurately, the saggar should be checked visually. However, in the heat treatment system of Japanese Patent No. 7041300, the condition of the saggar cannot be visually checked since the conveying path is covered by the hood.

The disclosure herein provides a technique for appropriately checking the condition of a saggar used to heat treat a material.

In a first aspect of the technology disclosed herein, a heat treatment system may comprise a heat treatment furnace including an entrance and an exit, and configured to heat treat a material in a saggar while the saggar is conveyed from the entrance to the exit; a conveyor configured to convey the saggar that exited from the exit of the heat treatment furnace to the entrance of the heat treatment furnace; a recovery device disposed on a conveying path of the conveyor and configured to recover the material heat-treated in the heat treatment furnace from the saggar; a supply device disposed on the conveying path of the conveyor between the recovery device and the entrance, and configured to supply a non-heat-treated material to the saggar in which the material is not accommodated; and a hood covering the conveying path. The conveying path may comprise a first conveying path disposed on at least a part of the conveying path between the recovery device and the supply device; and a second conveying path disposed on other part of the conveying path than the part where the first conveying path is disposed. The hood may be disposed over the second conveying path and may not be disposed over the first conveying path.

DETAILED DESCRIPTION

Figure 1:
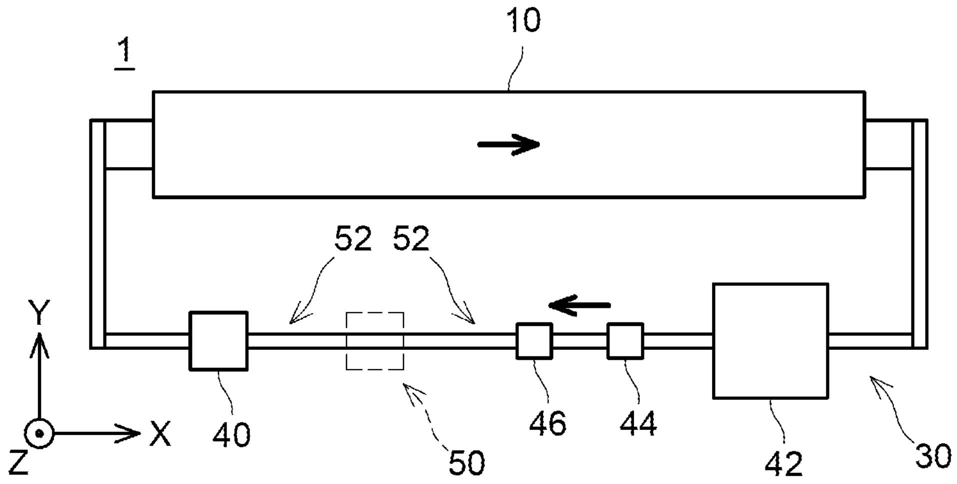
FIG. 1 shows a schematic diagram of a heat treatment system according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved heat treatment systems, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiments will herein be listed. It should be noted that the respective technical elements are independent of one another, and are useful solely or in combinations. The combinations thereof are not limited to those described in the claims as originally filed.

In a first aspect of the technology disclosed herein, a heat treatment system may comprise a heat treatment furnace including an entrance and an exit, and configured to heat treat a material in a saggar while the saggar is conveyed from the entrance to the exit; a conveyor configured to convey the saggar that exited from the exit of the heat treatment furnace to the entrance of the heat treatment furnace; a recovery device disposed on a conveying path of the conveyor and configured to recover the material heat-treated in the heat treatment furnace from the saggar; a supply device disposed on the conveying path of the conveyor between the recovery device and the entrance, and configured to supply a non-heat-treated material to the saggar in which the material is not accommodated; and a hood covering the conveying path. The conveying path may comprise a first conveying path disposed on at least a part of the conveying path between the recovery device and the supply device; and a second conveying path disposed on other part of the conveying path than the part where the first conveying path is disposed. The hood may be disposed over the second conveying path and may not be disposed over the first conveying path.

In the above heat treatment system, the first conveying path, which is disposed on at least a part of the conveying path between the recovery device and the supply device, is not covered by the hood, and thus there is a section between the recovery device and the supply device that allows for a visual check on the condition of the saggar. This facilitates a check on the condition of the saggar after the heat-treated material has been recovered in the recovery device and allows a more accurate check on whether the saggar is in a reusable condition or not.

In a second aspect of the technology disclosed herein according to the first aspect, the hood may comprise: openings defined between the first conveying path and the second conveying path; and separators disposed at the openings respectively and configured to separate a space inside the hood from a space outside the hood. In this configuration, it is possible to prevent foreign matters, etc. from entering a space covered by the hood where the second conveying path is disposed from an open space that is not covered by the hood where the first conveying path is disposed.

In a third aspect of the technology disclosed herein according to the first or second aspect, the first conveying path may comprise an outer edge parallel to a conveying direction of the saggar. The heat treatment system may further comprise a sensor configured to detect whether an object is on the outer edge. With this configuration, entry of a worker into the first conveying path, which is not covered by the hood, can be detected.

In a fourth aspect of the technology disclosed herein according to the third aspect, the conveyor may be configured to stop conveying the saggar when the sensor detects an object, and to convey the saggar when the sensor does not detect an object. This configuration allows the conveyor to automatically stop conveying the saggar when a worker enters the first conveying path.

In a fifth aspect of the technology disclosed herein according to any one of the first to fourth aspects, the first conveying path may comprise outer edges parallel to a conveying direction of the saggar. The saggar may comprise a first side surface facing one of the outer edges and a second side surface opposite to the first side surface. The heat treatment system may further comprise a reflector disposed to face the second side surface of the saggar while the saggar is conveyed on the first conveying path and configured to reflect the second side surface such that the second side surface is visible as the saggar is viewed from the first side surface. With this configuration, the first side surface of the saggar can be directly and visually checked and the second side surface of the saggar can be also visually checked via the reflection on the reflector. Thus, the second side surface of the saggar, which is a blind spot as the saggar 2 is viewed from the first side surface, can be visually checked.

In a sixth aspect of the technology disclosed herein according to any one of the first to fifth aspects, the heat treatment system may further comprise an image capturing device disposed on the first conveying path and configured to capture an image of the saggar while the saggar is conveyed on the first conveying path. With this configuration, the condition of the saggar can be checked by capturing an image of the saggar. Since the first conveying path is not covered by the hood, it has fewer restrictions on imaging conditions, such as lighting, compared to the second conveying path covered by the hood. Therefore, an image of the saggar can be captured appropriately.

In a seventh aspect of the technology disclosed herein according to the sixth aspect, the image capturing device may comprise a plurality of image capturing devices. The plurality of image capturing devices may be disposed on the first conveying path. With this configuration, images of the saggar can be captured by the plurality of image capturing devices, and thus the condition of the saggar can be checked more accurately.

In an eighth aspect of the technology disclosed herein according to any one of the first to seventh aspects, the heat treatment system may further comprise a cleaning device disposed on the first conveying path and configured to clean the saggar while the saggar is conveyed on the first conveying path. With this configuration, the saggar can be cleaned, so that the heat-treated material and/or foreign matters adhering to the saggar can be removed, if any. Since the heat-treated material and/or foreign matters adhering to the saggar can be removed on the first conveying path, the cleaned saggar free from the heat-treated material and/or foreign matters can be conveyed to the supply device, without removing the saggar from the conveying path.

In a ninth aspect of the technology disclosed herein according to the eighth aspect, the cleaning device may comprise a suction nozzle configured to suction an adhering substance on the saggar.

Embodiments

Figure 2:
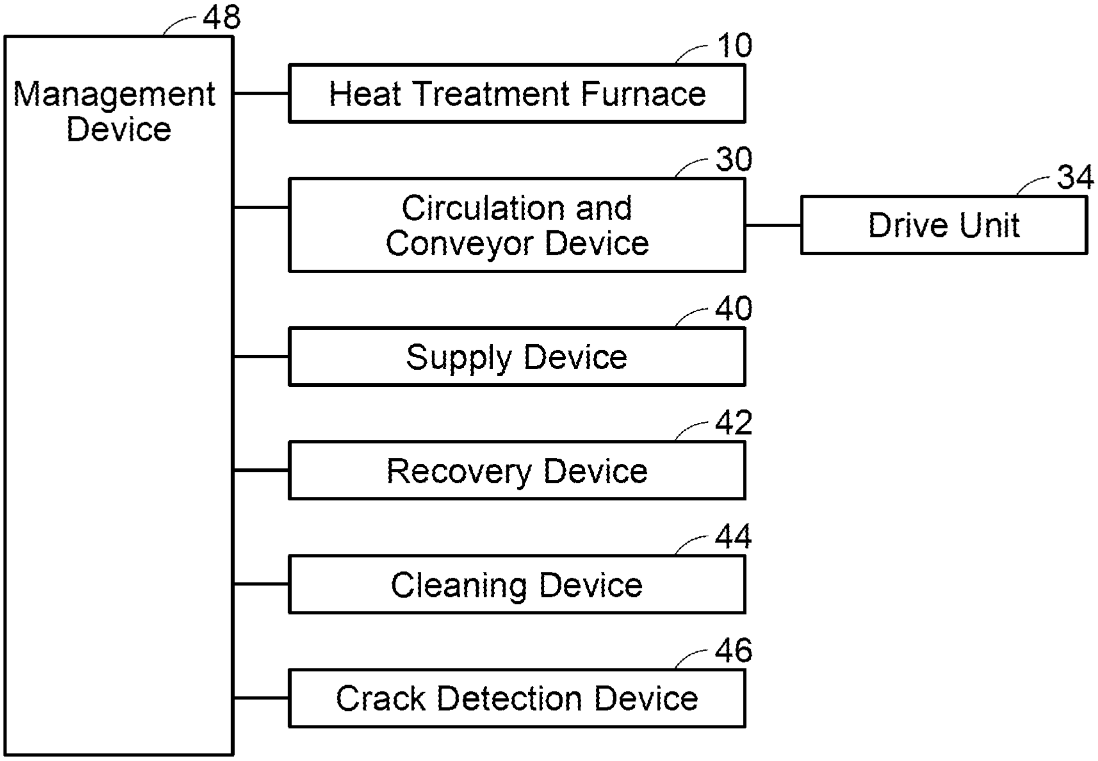
FIG. 2 is a block diagram showing a control system of the heat treatment system according to the first embodiment.

With reference to the drawings, a heat treatment system 1 according to an embodiment is described. As shown in FIGS. 1 and 2, the heat treatment system 1 comprises a heat treatment furnace 10, a circulation and conveyor device 30, a supply device 40, a recovery device 42, a cleaning device 44, a crack detection device 46, and a management device 48.

Figure 3:
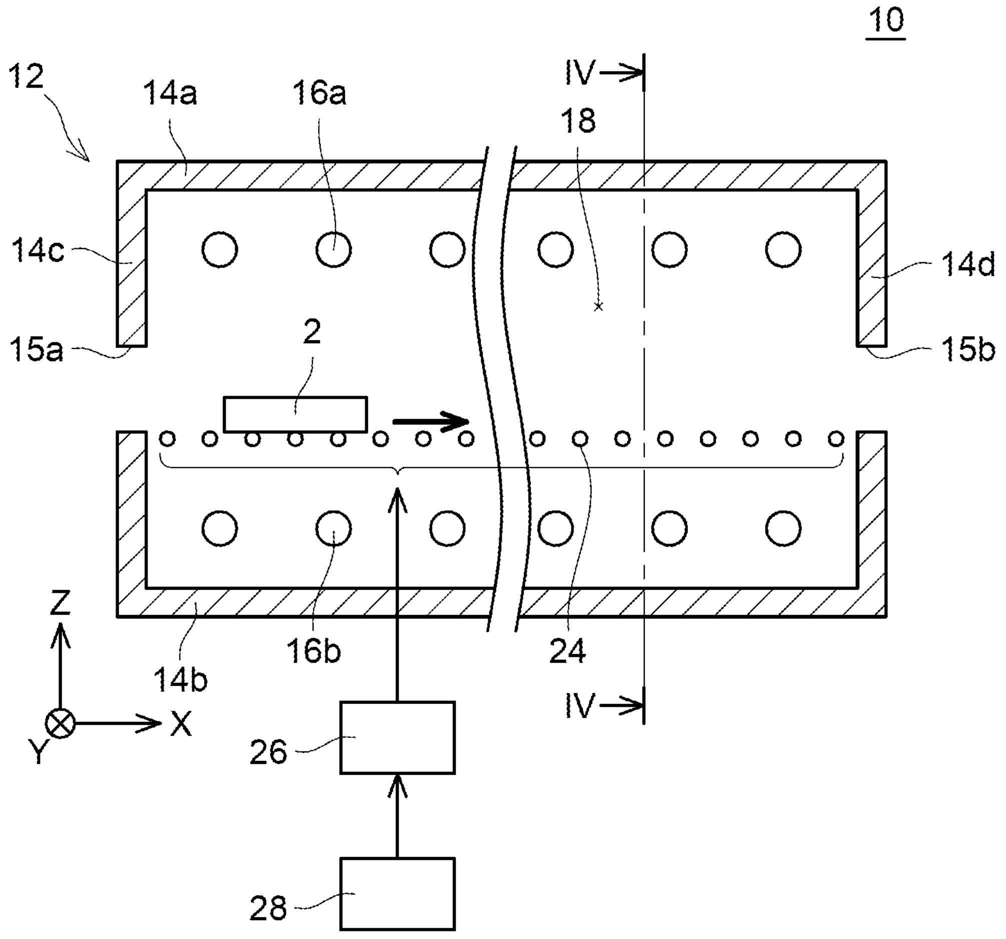
FIG. 3 shows a schematic diagram of a heat treatment furnace in a longitudinal cross-sectional view along a plane parallel to a conveying direction of a saggar.

The heat treatment system 1 heat treats a material in a saggar 2 (see FIG. 3). In this embodiment, the material in the saggar 2 is powder of lithium-ion battery cathode material. In the heat treatment system 1 according to the present embodiment, the saggar 2 circulates through the supply device 40, the heat treatment furnace 10, the recovery device 42, the cleaning device 44, and the crack detection device 46. The material is heat treated while the saggar 2 is conveyed through the heat treatment furnace 10. As shown in FIG. 2, the management device 48 is connected to the heat treatment furnace 10, the circulation and conveyor device 30, the supply device 40, the recovery device 42, the cleaning device 44, and the crack detection device 46. The management device 48 controls operations of the heat treatment furnace 10, the circulation and conveyor device 30, the supply device 40, the recovery device 42, the cleaning device 44, and the crack detection device 46.

Figure 4:
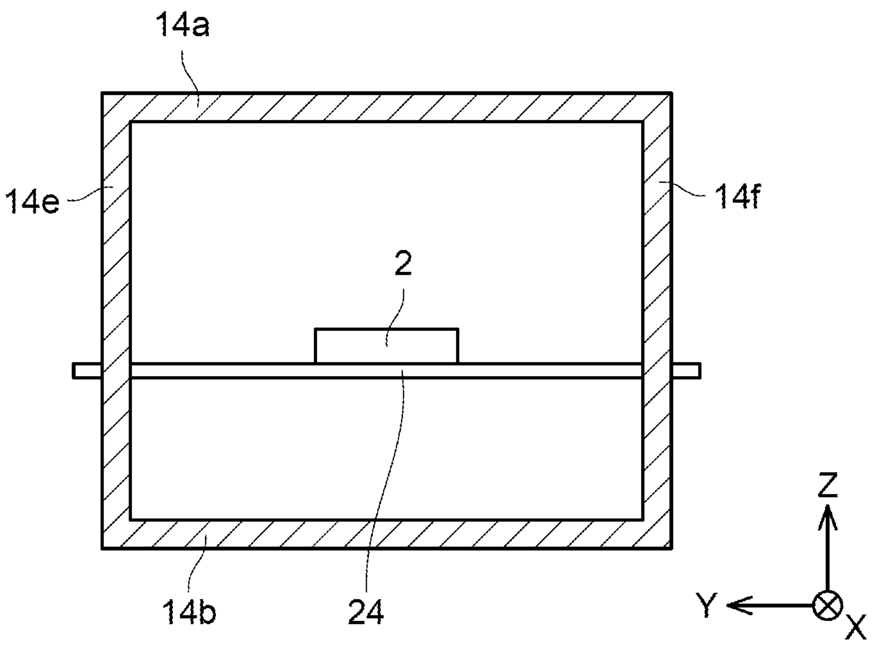
FIG. 4 is a cross-sectional view along a line IV-IV in FIG. 3.

The heat treatment furnace 10 heat treats the material in the saggar 2. As shown in FIGS. 3 and 4, the heat treatment furnace 10 comprises a furnace body 12 and a conveyor (24, 26). The heat treatment furnace 10 heat treats the material in the saggar 2 while the saggar 2 is conveyed through the furnace body 12 by the conveyor (24, 26).

The furnace body 12 has an outer shape of substantially cuboid, and a heat treatment space 18 therein is defined by a ceiling wall 14*a*, a bottom wall 14*b*, a furnace entrance wall 14*c*, a furnace exit wall 14*d*, and side walls 14*e* and 14*f*. As shown in FIG. 3, the ceiling wall 14*a* is parallel to the bottom wall 14*b* (i.e., parallel to XY plane). The furnace entrance wall 14*c* is located at one end of a conveying path and is perpendicular to a conveying direction (i.e., parallel to YZ plane). The furnace exit wall 14*d* is located at the other end of the conveying path and is parallel to the furnace entrance wall 14*c* (i.e., parallel to YZ plane). As shown in FIG. 4, the side walls 14*e* and 14*f* are parallel to the conveying direction and perpendicular to the ceiling wall 14*a* and the bottom wall 14*b* (i.e., parallel to XZ plane). A plurality of heaters 16*a*, 16*b* and a plurality of conveyor rollers 24 are disposed in the heat treatment space of the furnace body 12. The heaters 16*a* are located above the conveyor rollers 24 and are spaced apart from each other at predetermined intervals in the conveying direction, and the heaters 16*b* are located below the conveyor rollers 24 and are spaced apart from each other at predetermined intervals in the conveying direction. By the heaters 16*a* and 16*b* producing heat, the space 18 in the furnace body 12 and the material in the saggar 2 are heated. As shown in FIG. 3, an opening 15*a* is formed in the furnace entrance wall 14*c* and an opening 15*b* is formed in the furnace exit wall 14*d*. The saggar 2 is carried into the heat treatment furnace 10 through the opening 15*a* and carried out of the heat treatment furnace 10 through the opening 15*b* by the conveyor (24, 26). In other words, the opening 15*a* serves as an entrance of the heat treatment furnace 10 and the opening 15*b* serves as an exit of the heat treatment furnace 10.

The conveyor (24, 26) comprises the plurality of conveyor rollers 24 and a drive unit 26. The conveyor rollers 24 convey the saggar 2. The conveyor (24, 26) carries the saggar 2 into the heat treatment furnace 10 from the opening 15*a* and carries the saggar 2 out of the heat treatment furnace 10 from the opening 15*b*. The conveyor rollers 24 are each cylindrical, and their axes extend in a direction perpendicular to the conveying direction (i.e., in Y direction). The conveyor rollers 24 all have the same diameter and are equally spaced apart from each other in the conveying direction. The conveyor rollers 24 are supported such that they are rotatable about their axes and are rotated by drive power of the drive unit 26 being transmitted thereto. The drive unit 26 is a drive unit (e.g., a motor) configured to drive the conveyor rollers 24. The drive unit 26 is connected to the conveyor rollers 24 via a power transmission mechanism. When the drive power of the drive unit 26 is transmitted to the conveyor rollers 24 via the power transmission mechanism (e.g., a sprocket-chain mechanism), the conveyor rollers 24 are thereby rotated. The drive unit 26 drives each of the conveyor rollers 24 such that the conveyor rollers 24 rotate at approximately the same speed. The drive unit 26 is controlled by a controller 28. In the present embodiment, the conveyor rollers 24 all have the same diameter, but they may have different diameters. Conveyor rollers with different diameters may be installed in the heat treatment furnace 10.

As shown in FIG. 1, the circulation and conveyor device 30 conveys the saggar 2 that exited from the exit (i.e., opening 15*b*) of the heat treatment furnace 10 to the entrance (i.e., opening 15*a*) of the heat treatment furnace 10. The circulation and conveyor device 30 comprises a plurality of conveyor rollers 32 (see FIGS. 5 and 6) and a drive unit 34 (see FIG. 2). The conveyor rollers 32 are each cylindrical, and their axes extend in the direction perpendicular to the conveying direction. The conveyor rollers 32 all have the same diameter and are equally spaced apart from each other in the conveying direction. The conveyor rollers 32 are supported such that they are rotatable about their axes and are rotated by drive power of the drive unit 34 being transmitted thereto. The drive unit 34 is a drive unit (e.g., a motor) configured to drive the conveyor rollers 32. The drive unit 34 is connected to the conveyor rollers 32 via a power transmission mechanism. When the drive power of the drive unit 34 is transmitted to the conveyor rollers 32 via the power transmission mechanism (e.g., a sprocket-chain mechanism), the conveyor rollers 32 are thereby rotated. The drive unit 34 drives each of the conveyor rollers 32 such that the conveyor rollers 32 rotate at approximately the same speed. In the present embodiment, the conveyor rollers 32 all have the same diameter, but they may have different diameters. Conveyor rollers with different diameters may be installed on a conveying path of the circulation and conveyor device 30.

Figure 5:
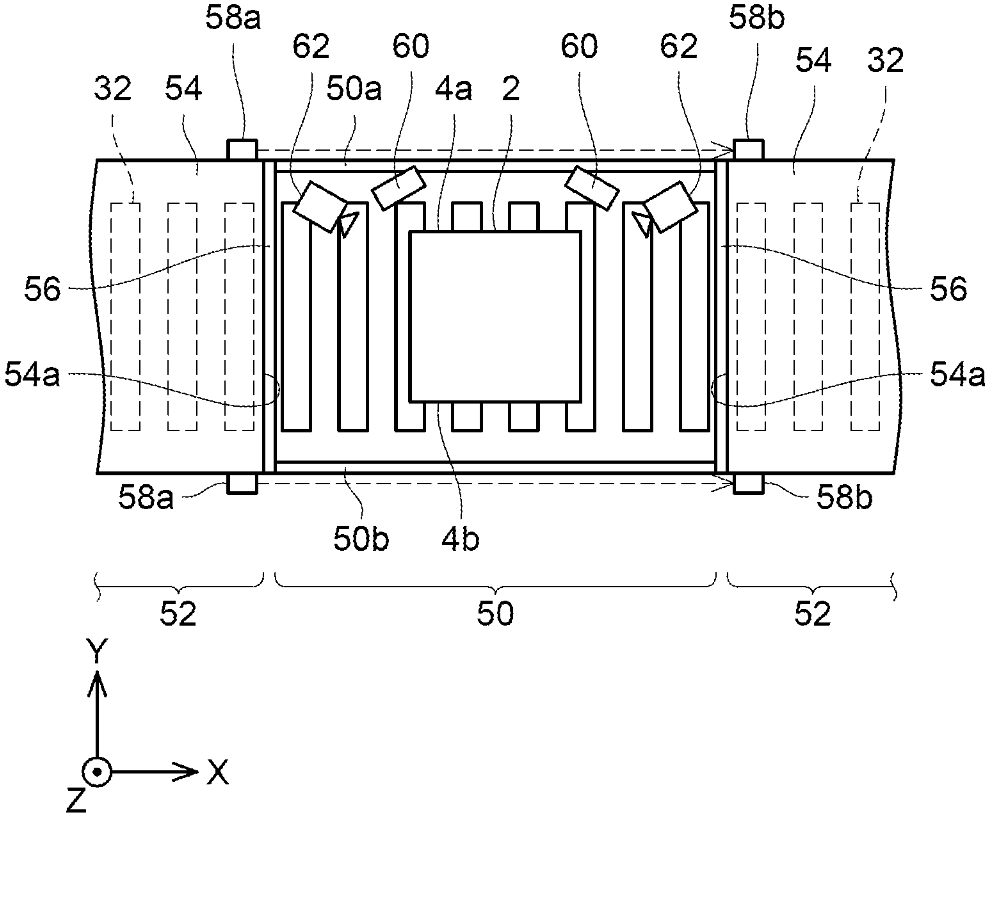
FIG. 5 shows a top view of a first and second conveying paths.
Figure 6:
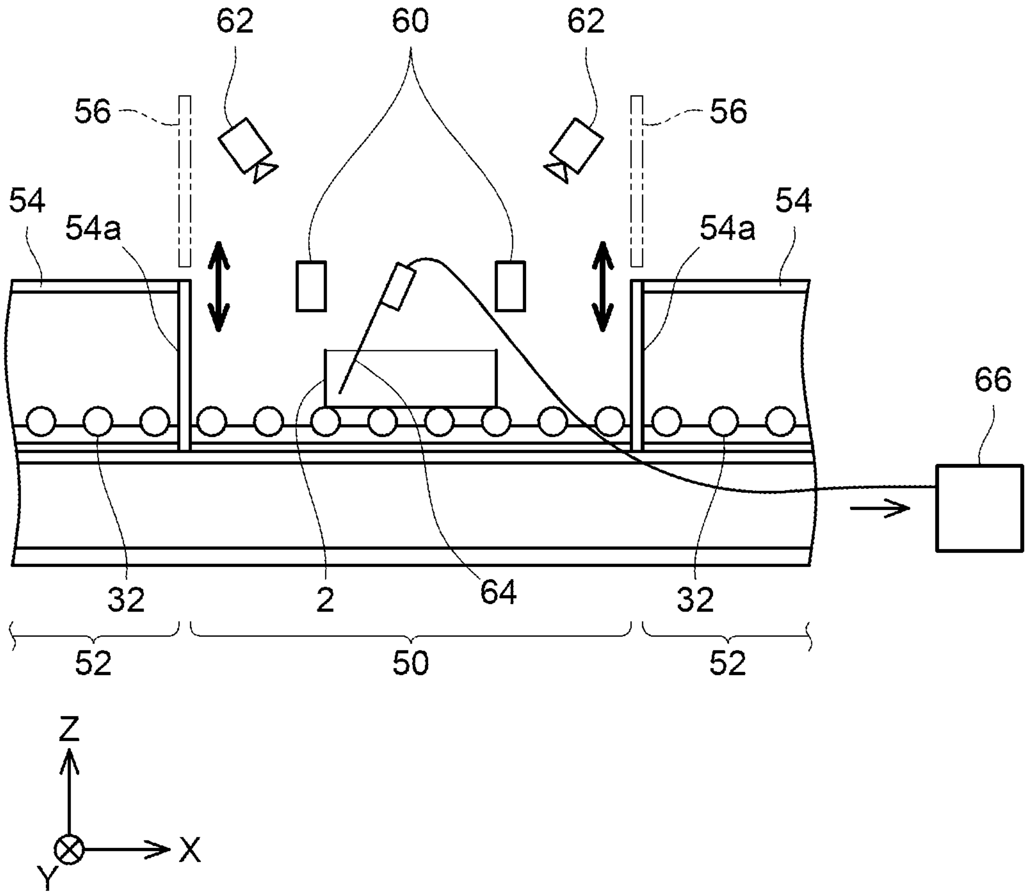
FIG. 6 shows a side view of the first and second conveying paths.

As shown in FIGS. 5 and 6, the conveying path of the circulation and conveyor device 30 includes a part covered by a hood 54 and a part that is not covered by the hood 54. Specifically, the part of the conveying path of the circulation and conveyor device 30 that is not covered by the hood 54 is located between the recovery device 42 and the supply device 40. Hereinafter, the part of the conveying path of the circulation and conveyor device 30 that is not covered by the hood 54 is referred to as "first conveying path 50", and the part of the conveying path of the circulation and conveyor device 30 that is covered by the hood 54 is referred to as "second conveying path 52". As shown in FIG. 1, in this embodiment, the first conveying path 50 is located between the crack detection device 46 and the supply device 40. The first conveying path 50 and the second conveying path 52 will be described in detail later.

As shown in FIG. 1, the supply device 40 is disposed on the conveying path of the circulation and conveyor device 30. The supply device 40 is located upstream of the entrance of the heat treatment furnace 10, and in this embodiment, it is located between the crack detection device 46 and the entrance of the heat treatment furnace 10. In this embodiment, the supply device 40 is located downstream of the first conveying path 50 (i.e., the part of the conveying path that is not covered by the hood 54) and supplies the material (i.e., powder) into the saggar 2. The supply device 40 may have any configuration as long as it is configured to supply the powder into the saggar 2, and its specific structure is not limited. For example, the supply device 40 comprises a supply part and a leveling part. The supply part is configured to supply the powder into the saggar 2. Specifically, the supply part comprises a supply port through which the powder falls into the saggar 2 from above the saggar 2. The supply port is positioned above the center of the saggar 2 when the saggar 2 is placed inside the supply part. The supply part comprises a positioner. The positioner positions the saggar 2 conveyed into the supply part such that it is positioned below the supply port. The supply part may include a plurality of supply ports. Since the supply part supplies the powder into the saggar 2 by dropping the powder from above, once the powder has been supplied into the saggar 2 in the supply part, the top surface of the powder in the saggar 2 has a raised portion right below the supply port. The leveling part levels the powder supplied into the saggar 2 in the supply part. Specifically, the leveling part is configured to level the top surface of the powder by pressing a side surface of a flat plate against the top surface of the powder in the saggar 2. By leveling the top surface of the powder using the leveling part, the top surface of the powder in the saggar 2 becomes substantially horizontal.

The recovery device 42 is disposed on the conveying path of the circulation and conveyor device 30. The recovery device 42 is located downstream of the exit of the heat treatment furnace 10, and in this embodiment, it is located between the exit of the heat treatment furnace 10 and the cleaning device 44. The recovery device 42 recovers the material (i.e., powder) heat-treated in the heat treatment furnace 10 from the saggar 2. The recovery device 42 may have any configuration as long as it is configured to recover the powder from the saggar 2, and its specific structure is not limited. For example, the recovery device 42 comprises an inversion mechanism that inverts the saggar 2 upside down to recover the heat-treated material and an air recovery mechanism that recovers the heat-treated material (in this embodiment, powder) adhering to the surface of the saggar 2 by peeling it off with air. The inversion mechanism inverts the saggar 2 upside down to transfer the powder in the saggar 2 into a recovery container. As a result, almost all of the powder in the saggar 2 is transferred into the recovery container. Thereafter, the inversion mechanism inverts the saggar 2 upside down again to return it to its original orientation. The air recovery mechanism is used after the powder in the saggar 2 has been recovered by the inversion mechanism. The air recovery mechanism blows air onto the inner surface of the saggar 2 while suctioning air inside the saggar 2. By blowing air onto the inner surface of the saggar 2, the powder adhering to the inner surface of the saggar 2 is peeled off from the inner surface. Suctioning air in the saggar 2 while blowing air onto the inner surface of the saggar 2 allows the powder peeled off from the inner surface of the saggar 2 to be suctioned together with the air. This allows for recovery of the powder remaining on the inner surface of the saggar 2 and an increased powder recovery rate. In the above example, the recovery device 42 comprises the air recovery mechanism, but it is not limited to such a configuration. For example, the powder remaining on the inner surface of the saggar 2 may be peeled off from the inner surface of the saggar 2 with a rotating brush for recovery.

The cleaning device 44 is disposed on the conveying path of the circulation and conveyor device 30. The cleaning device 44 is located between the recovery device 42 and the crack detection device 46. The cleaning device 44 cleans the inner surface of the saggar 2 after the heat-treated material (i.e., powder) has been recovered in the recovery device 42. The cleaning device 44 may have any configuration as long as it is configured to clean the inner surface of the saggar 2, and its specific structure is not limited. For example, the cleaning device 44 suctions air, etc. inside the saggar 2 while peeling off substances adhering to the inner surface of the saggar 2 with a rotating brush. The suctioned air, etc. contains the peeled-off substances. By cleaning the inner surface of the saggar 2 with the cleaning device 44, the powder, etc. remaining on the inner surface of the saggar 2 can be completely removed.

The crack detection device 46 is disposed on the conveying path of the circulation and conveyor device 30. The crack detection device 46 is located between the cleaning device 44 and the supply device 40. In this embodiment, the crack detection device 46 is located upstream of the first conveying path 50 (i.e., the part of the conveying path that is not covered by the hood 54). The crack detection device 46 inspects whether the saggar 2 is cracked or not by detecting cracks on the saggar 2. The saggar 2 is repeatedly used to heat treat the material in the heat treatment furnace 10. After the saggar 2 is used for heat treatment of the material in the heat treatment furnace 10, the crack detection device 46 inspects whether the saggar 2 is cracked or not before it is used again. The crack detection device 46 may have any configuration as long as it is configured to detect cracks on the saggar 2, and its specific configuration is not limited. For example, the crack detection device 46 may detect cracks on the saggar 2 using a laser. The crack detection device 46 may also detect cracks on the saggar 2 by filling the saggar 2 with gas and measuring the pressure in the saggar 2. If it is detected that the saggar 2 is cracked, the saggar 2 is removed from the conveying path of the circulation and conveyor device 30. If it is detected that the saggar 2 is not cracked, the saggar 2 is conveyed to the supply device 40 by the circulation and conveyor device 30.

The first conveying path 50 and the second conveying path 52 are now described in more detail. As mentioned above, the conveying path of the circulation and conveyor device 30 includes the first conveying path 50, which is not covered by the hood 54, and the second conveying path 52, which is covered by the hood 54. As shown in FIG. 1, the first conveying path 50 is disposed only on a part of the conveying path of the circulation and conveyor device 30 between the crack detection device 46 and the supply device 40. In other words, only a part of the conveying path of the circulation and conveyor device 30 between the crack detection device 46 and the supply device 40 is the first conveying path 50, which is not covered by the hood 54, and the most part of the conveying path of the circulation and conveyor device 30 is the second conveying path 52, which is covered by the hood 54. Since the second conveying path 52 is covered by the hood 54, it is possible to prevent foreign matters from entering into the saggar 2 from the outside while the saggar 2 is conveyed on the second conveying path 52. On the other hand, since the second conveying path 52 is covered by the hood 54, the saggar 2 cannot be seen while being conveyed on the second conveying path 52.

The first conveying path 50 is not covered by the hood 54. Therefore, the saggar 2 can be seen from the outside of the conveyance path of the circulation and conveyor device 30 while being conveyed on the first conveying path 50. After the heat-treated material in the saggar 2 has been recovered in the recovery device 42, the saggar 2 is conveyed through the cleaning device 44 and the crack detection device 46, and then conveyed into the first conveying path 50. That is, the saggar 2 is conveyed into the first conveying path 50 after cleaning in the cleaning device 44 and inspected whether it is cracked or not in the crack detection device 46. Therefore, the saggar 2 conveyed into the first conveying path 50 is clean on the inside and not cracked. However, even after being cleaned in the cleaning device 44, some heat-treated material may remain in the saggar 2. For example, some heat-treated material may remain at corners of the saggar 2 because the corners of the saggar 2 are hard to clean compared to other parts of the saggar 2. Further, if a large amount of heat-treated material remains in the saggar 2 when the heat-treated material is recovered from the saggar 2 in the recovery device 42, the cleaning device 44 may fail to completely remove (e.g., suction) the remaining heat-treated material in the saggar 2. Moreover, since the saggar 2 is inverted in the recovery device 44 to recover the heat-treated material, the heat-treated material may float in the air due to the inversion and it may adhere to the outer surface of the saggar 2. In such cases, even after the saggar 2 is cleaned by the cleaning device 44, the heat-treated material may still adhere to the inner and/or outer surface(s) of the saggar 2. In addition, cracks on the saggar 2 may not be detected by the crack detection device 46. For example, if the saggar 2 has minute cracks and/or has cracks at its corners, the crack detection device 46 may fail to detect such cracks on the saggar 2. For this reason, in this embodiment, after the saggar 2 has been conveyed through the cleaning device 44 and the crack detection device 46, a worker visually checks the saggar 2 to see if the heat-treated material still remains in the saggar 2 even after the cleaning device 44 and there are cracks on the saggar 2 that were not detected by the crack detection device 46. Since the first conveying path 50 is not covered by the hood 54, the condition of the saggar 2 can be visually checked while it is conveyed on the first conveying path 50.

Openings **54*a* are defined in the hood 54 between the first and second conveying paths 50 and 52. The openings 54*a* are perpendicular to the conveying direction of the saggar 2. The openings 54*a* allow the saggar 2 to pass between the first conveying path 50 and the second conveying path 52**.

A door 56 is disposed at each opening **54*a*. Each door 56 has a flat plate shape that covers its corresponding opening 54*a*. The doors 56 can be moved upward and downward by a drive unit, which is not shown. When the doors 56 are at the downward position, the doors 56 are in a closed state in which they cover the openings 54*a*, whereas when the doors 56 are at the upward position, they are in an open state in which they uncover the openings 54*a*. The doors 56 are shifted to the open state when the saggar 2 is conveyed between the first conveying path 50 and the second conveying path 52, while they are shifted to the closed state when the saggar 2 is not conveyed between the first conveying path 50 and the second conveying path 52. By the doors 56 being disposed at the openings 54*a*, the saggar 2 can be conveyed through the openings 54*a* between the first conveying path 50 and the second conveying path 52, while foreign matters, etc. can be prevented from entering the hood 54 covering the second conveying path 52 through the openings 54*a* from outside the hood 54**.

In this embodiment, the doors 56 are disposed at the openings **54*a*, but another configuration may be employed. Any configuration may be employed as long as it can prevent foreign matters, etc. from entering the hood 54 covering the second conveying path 52 from outside the hood 54. For example, air curtains may be disposed at the openings 54*a*. The air curtains each includes an air outlet. The air outlets are configured to blow air out along the openings 54*a* in a direction perpendicular to the conveying direction of the saggar 2. The air outlets constantly blow out air even while the saggar 2 is conveyed between the first conveying path 50 and the second conveying path 52. By the air curtains being disposed at the openings 54*a*, the saggar 2 can be conveyed through the openings 54*a* between the first conveying path 50 and the second conveying path 52, while foreign matters, etc. can be prevented from entering the hood 54 covering the second conveying path 52 through the openings 54*a* from outside the hood 54**.

Sensors (**58*a*, 58*b*) are disposed at the first conveying path 50. The sensors (58*a*, 58*b*) are optical sensors each including a light emitter 58*a* and a light receiver 58*b*. The first conveying path 50 includes two outer edges 50*a* and 50*b* parallel to the conveying direction of the sagger 2. The sensors (58*a*, 58*b*) are arranged to detect objects on the outer edges 50*a*, 50*b* of the first conveying path 50. That is, a pair of the light emitter 58*a* and the light receiver 58*b* is located near the outer edge 50*a* and another pair of the light emitter 58*a* and the light receiver 58*b* is located near the outer edge 50*b*. Further, the light emitters 58*a* are located downstream of the outer edges 50*a* and 50*b*, and the light receivers 58*b* are located upstream of the outer edges 50*a* and 50*b*. The light emitters 58*a* are arranged to emit light along the outer edges 50*a* and 50*b*, and the light receivers 58*b* are arranged to receive the light emitted from the light emitters 58*a*. The light emitters 58*a* may be located upstream of the outer edges 50*a* and 50*b*, and the light receivers 58*b* may be located downstream of the outer edges 50*a* and 50*b*. Since the first conveying path 50 is not covered by the hood 54, a worker could accidentally enter the first conveying path 50. When a worker enters the first conveying path 50 over the outer edge 50*a* or 50*b* from outside the first conveying path 50, the light from the light emitter 58*a* is blocked by the worker and the sensor (58*a*, 58*b*) thereby detects the worker on the outer edge 50*a* or 50*b*. The sensors (58*a*, 58*b*) may detect not only the worker on the outer edge 50*a*, 50*b*, but also the saggar 2 on the outer edge 50*a*, 50*b***.

The sensors (more precisely, the light receivers **58*b*) are configured to output a detection result to a controller (not shown) of the circulation and conveyor device 30. When receiving a detection result that an object (e.g., a worker, etc.) is on the outer edge 50*a* or 50*b*, the controller of the circulation and conveyor device 30 causes the conveyor rollers 32 to stop conveying the saggar 2. Specifically, the controller stops the drive unit 34 to stop the rotation of the conveyor rollers 32, so that the conveyance of the saggar 2 is stopped. The conveyance of the saggar 2 by the conveyor rollers 32 is stopped in response to worker's entry into the first conveying path 50, thereby avoiding the saggar 2 coming into contact with the worker. When receiving detection results that there is no object (e.g., a worker, etc.) on the outer edges 50*a*, 50*b*, the controller of the circulation and conveyor device 30 causes the conveyor rollers 32 to start conveying the saggar 2. Thus, the conveyance of the saggar 2 can be automatically resumed once the worker has left the first conveying path 50**.

Reflectors 60, image capturing devices 62, and a suction nozzle 64 are disposed on the first conveying path 50.

The reflectors 60 are located between one of the two outer edges **50*a* and 50*b* (in FIG. 5, the outer edge 50*a*) and the saggar 2 on the conveyor rollers 32. In this embodiment, the first conveying path 50 is configured to allow the worker to see the first conveying path 50 from −Y direction side relative to the first conveying path 50. The reflectors 60 are located near the outer edge 50*a* (i.e., the outer edge 50*a* on +Y direction side), which is farther away from where the worker sees the first conveying path 50** (in this embodiment, −Y direction side).

The reflectors 60 are arranged to reflect a side surface **4*a*, which faces the reflectors 60, of the saggar 2 on the first conveying path 50 such that the worker can see the side surface 4*a* at the position where the worker sees the first conveying path 50 (in this embodiment, on −Y direction side). The worker can directly see a side surface 4***b* of the saggar 2, which is opposite to the side surface 4*a* facing the reflectors 60, and can also see the side surface 4*a* of the saggar 2, which faces the reflectors 60, via the reflectors 60. Thus, the worker can simultaneously check the both side surfaces 4*a* and 4*b* of the saggar 2, which are parallel to the conveying direction, from one of the two outer edges 50*a* and 50*b* (in FIG. 5, the outer edge 50*b*). The reflectors 60 disposed on the first conveying path 50 allow the worker to check the part of the saggar 2 that is in a blind spot from the worker. In the present embodiment, two reflectors 60 are disposed. Using a plurality of reflectors 60 (in this embodiment, two reflectors 60) on the first conveying path 50 facilitates a check on the entire saggar 2 from one of the two outer edges 50*a* and 50*b*. The number of reflectors 60 is not limited, and may be one, or three or more.

The image capturing devices 62 are arranged to capture images of the saggar 2 on the first conveying path 50. The plurality of image capturing devices 62 (in this embodiment, two image capturing devices 62) is arranged on the first conveying path 50. As shown in FIG. 5, the image capturing devices 62 are disposed near the outer edge 50*a* (i.e., the outer edge 50*a* on +Y direction side), which is farther away from the position where the worker sees the first conveying path 50 (−Y direction side), and capture images of the saggar 2 from the outer edge 50*a* side. As described above, since the worker sees the first conveying path 50 from the outer edge 50*b* side, the worker can directly see the side surface 4*b* of the saggar 2, which faces the outer edge 50*b* but has difficulty in seeing the side surface 4*a* of the saggar 2, which faces the outer edge 50*a* (i.e., faces away from the worker). Capturing images of the saggar 2 from the outer edge 50*a* side by the image capturing devices 62 allows the worker to check the part of the saggar 2 that is in the blind spot from the worker. As shown in FIG. 6, the image capturing devices 62 also capture images of the saggar 2 on the first conveying path 50 from above. This facilitates a check on the inside of the saggar 2. The number of image capturing devices 62 is not limited, and may be one, or three or more.

The suction nozzle 64 is used by the worker to clean the saggar 2 on the first conveying path 50. The suction nozzle 64 is connected to a dust collector 66. As mentioned above, the heat-treated material may adhere to the inside and/or outer surface of the saggar 2 on the first conveying path 50. If any, the worker can find the adhesion of the heat-treated material by directly seeing the saggar 2, by visually checking the saggar 2 via the reflectors 60, and/or by checking the condition of the saggar 2 from the images captured by the image capturing devices 62. In this instance, the worker suctions the heat-treated material adhering to the saggar 2 using the suction nozzle 64, so that the heat-treated material adhering to the saggar 2 can be removed within the first conveying path 50 and the cleaned saggar 2 can be conveyed to the supply device 40.

The following are some notes on the heat treatment system 1 described in the embodiment. The circulation and conveyor device 30 is an example of "conveyor", and the doors 56 is an example of "separator".

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A heat treatment system comprising:
- a heat treatment furnace including an entrance and an exit, and configured to heat treat a material in a saggar while the saggar is conveyed from the entrance to the exit;
- a conveyor configured to convey the saggar that exited from the exit of the heat treatment furnace to the entrance of the heat treatment furnace;
- a recovery device disposed on a conveying path of the conveyor and configured to recover the material heat-treated in the heat treatment furnace from the saggar;
- a supply device disposed on the conveying path of the conveyor between the recovery device and the entrance, and configured to supply a non-heat-treated material to the saggar in which the material is not accommodated; and
- a hood covering the conveying path,
- wherein the conveying path comprises:
  - a first conveying path disposed on at least a part of the conveying path between the recovery device and the supply device; and
  - a second conveying path disposed on other part of the conveying path than the part where the first conveying path is disposed, and
  - the hood is disposed over the second conveying path and is not disposed over the first conveying path; and
- wherein the hood comprises:
  - openings defined between the first conveying path and the second conveying path; and
- separators disposed at the openings respectively and configured to separate a space inside the hood from a space outside the hood.

2. The heat treatment system according to claim 1, wherein
- the first conveying path comprises an outer edge parallel to a conveying direction of the saggar, and
- the heat treatment system further comprises a sensor configured to detect whether an object is on the outer edge.

3. The heat treatment system according to claim 2, wherein the conveyor is configured to stop conveying the saggar when the sensor detects an object, and to convey the saggar when the sensor does not detect an object.

4. The heat treatment system according to claim 1, wherein
- the first conveying path comprises outer edges parallel to a conveying direction of the saggar,
- the saggar comprises a first side surface facing one of the outer edges and a second side surface opposite to the first side surface, and
- the heat treatment system further comprises a reflector disposed to face the second side surface of the saggar while the saggar is conveyed on the first conveying path and configured to reflect the second side surface such that the second side surface is visible as the saggar is viewed from the first side surface.

5. The heat treatment system according to claim 1, further comprising an image capturing device disposed on the first conveying path and configured to capture an image of the saggar while the saggar is conveyed on the first conveying path.

6. The heat treatment system according to claim 5, wherein the image capturing device comprises a plurality of image capturing devices; and the plurality of image capturing devices is disposed on the first conveying path.

7. The heat treatment system according to claim 1, further comprising a cleaning device disposed on the first conveying path and configured to clean the saggar while the saggar is conveyed on the first conveying path.

8. The heat treatment system according to claim 7, wherein the cleaning device comprises a suction nozzle configured to suction an adhering substance on the saggar.

* * * * *